Jan. 2, 1940.     E. B. BRITTIN     2,185,782
CLAMPING DEVICE
Filed Jan. 12, 1938
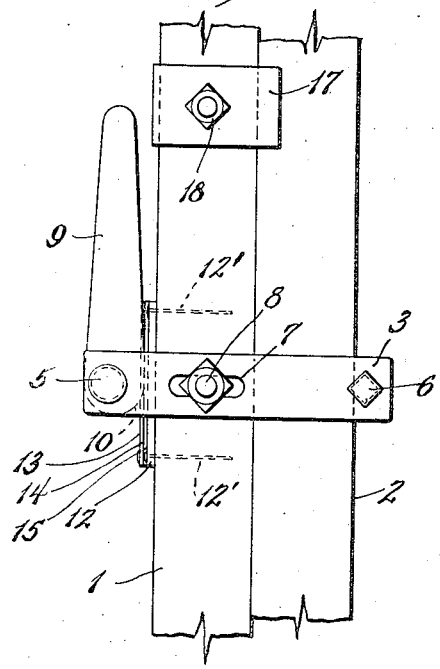
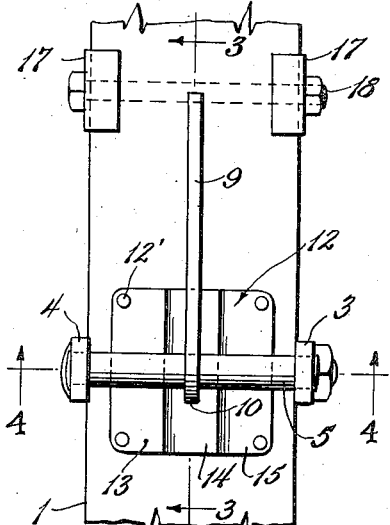
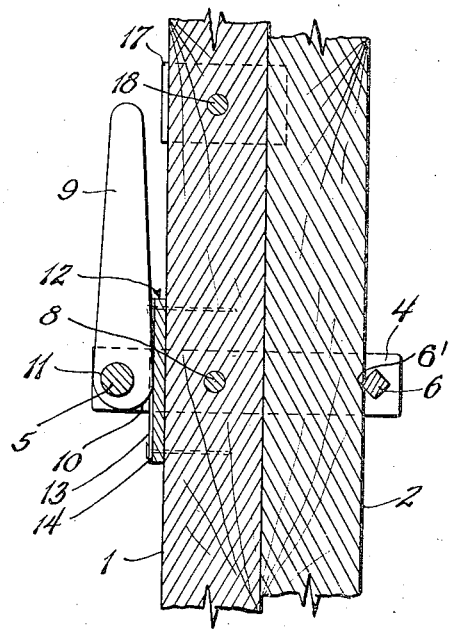
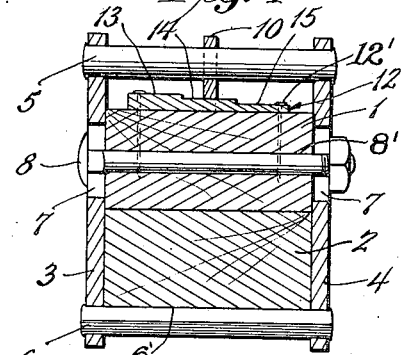
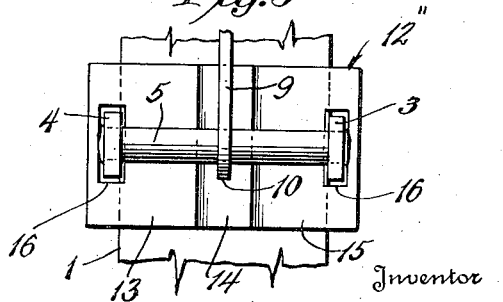
Inventor
Edward B. Brittin
By Raymond Jones,
Attorney Patented Jan. 2, 1940

2,185,782

UNITED STATES PATENT OFFICE 2,185,782

CLAMPING DEVICE

Edward B. Brittin, Springfield, Ill.

Application January 12, 1938, Serial No. 184,668

3 Claims. (Cl. 24—17)

This invention relates to a clamping device for use on scaffolds, ladders, tables and the like, and more particularly to a clamping device adapted to be used in connection with adjustable leg extensions.

The main object of the invention is to provide a clamp arranged to embrace a pair of leg portions and having means to force said portions together to prevent relative slippage between the portions.

Another object is to provide a clamp which is readily adjustable while in operative position to compensate for various thicknesses of material engaged thereby.

Another object is to provide a clamp which has a novel means to engage and bite into an engaged leg section in a manner to prevent slippage of such section.

A further object is to provide a clamp which is rugged in construction, simple and economical to manufacture and easy to install and operate.

Other objects will become apparent from the detailed specification which follows and the accompanying drawing, wherein—

Figure 1 shows a side elevational view of my improved clamp in operative position;

Fig. 2 is a view in front elevation of the device shown in Fig. 1;

Fig. 3 is a view in section on line 3—3 of Fig. 2;

Fig. 4 is a view in section on line 4—4 of Fig. 2; and

Fig. 5 is a detail view of a modification.

Referring to the drawing in detail, a clamp constructed in accordance with this invention is shown in operative position mounted upon a pair of leg sections 1 and 2. The section 1 may be a leg of a scaffold support, ladder, table or like device. The section 2 functions as an extension portion of such leg and is adjustable on the section 1 to vary the length of this section.

The clamping device comprises a pair of main side members 3 and 4 preferably of strap form which are connected together and maintained rigid relative to each other by means of a front transverse rod 5 and a rear transverse rod 6. The rod 5 is cylindrical in cross section while the rod 6 is square in cross section. The opposite end of rods 5 and 6 are shown as engaged within correspondingly shaped openings formed transversely in members 3 and 4. The ends of each rod may be headed or upset in the manner of a rivet to cause the ends of the rods to expand and tightly engage a respective side member. If desired, the ends of these rods may be welded to the side members or secured thereto in any other desired rigid manner.

It will be noted that one edge 6' of the bar 6 is positioned to engage the surface of the section 2 for a purpose to be described. A slot 7 is formed in each member 3 and 4 between the rods 5 and 6. These slots provide a means to secure the clamp in more or less permanent position upon the main leg section 1. One form of connection comprises a rod or bolt 8 which is engaged within a transverse opening 8' formed in section 1, the ends of bolt 8 loosely engaging a respective slot 7 in a manner to permit the members 3 and 4 to slide fore and aft on the rod 8 a limited amount.

A clamping member in the form of a lever 9 is pivotally mounted on the rod 5. The lever 9 terminates in an eccentric cam-shaped terminal head 10 and the head 10 is drilled to form an opening 11 which slidably receives the rod 5. The eccentric head 10 therefor may slide laterally on rod 5 and pivot therearound.

A clamp plate 12 is shown in Fig. 2 secured in position on the leg 1 by means of nails or screws 12' to be engaged by the head 10 when the latter is rotated on the rod 5. The plate 12 is formed to provide a series of stepped portions 13, 14, 15 of any desired number. In a preferred form, when is is desired to support the plate 12 in a permanent position on the clamp, the plate is extended to a width greater than the distance between the outer faces of members 3 and 4 as shown in Fig. 5, and a pair of slots 16 is formed adjacent the outer edges of the plate. During assembly, the members 3 and 4 are passed through the slots 16 in a manner to permit the plate 12" to slide fore and aft on these members.

In the use of the clamp disclosed, it will be secured in position on a leg section 1 as above described by means of the bolt 8. The extension section 2 is positioned between the main leg 1 and cross rod 6. The sections 1 and 2 are then forced together by rotating the lever 9 to its vertical position in Fig. 1 on the rod 5 to cause the head 10 to engage a desired one of the series of stepped surfaces 13, 14 or 15. According to the combined thicknesses of the sections 1 and 2, the head 10 may be slid along the rod 5 to engage a stepped surface described that will permit an effective maximum clamping action between the head 10 and the square rod 6. During the clamping action, the forward edge 6' of rod 6 will engage and bite into the rear surface of the section 2 in a manner to prevent slippage therebetween. The members 3 and 4 are permitted to slide fore and aft according to which one of the plate surfaces 13, 14 or 15 may be in use. According to the thickness of the section 2, the bars 3 and 4 will be permitted to slide over the ends of the bolt 8. The clamp is released by rotating lever 9 in a counterclockwise direction from its clamping position shown in Figs. 1 and 3.

It will be seen, therefore, that I have provided a slidable clamp lever 9 which is adapted to engage any desired one of a series of stepped plate surfaces 13, 14 and 15 whereby to compensate for varying thicknesses of material positioned within the clamp. According to such thickness, the clamp members 3 and 4 are permitted to slide relative to the main leg 1. The square rod 6 may be cut from a standard stock bar size and be positioned as described to permit one edge 6' thereof to engage and embed itself in the material of the section 2. It will be noted also that a heavy load on the leg 1 will tend to cause the extension 2 to slide therealong. In so doing, however, the distance between the head 10 and the point where the edge 6' engages section 2 will be increased with the result that the edge 6' will be caused to embed itself further into the face of the extension 2 to thereby increase the clamping action and resist further slippage between sections 1 and 2.

A guide member 17 is shown as secured to each side of the leg 1 by means of bolts 17, and this member is extended to overlap the side of the extension 2 in a manner to guide the latter as it slides along the leg 1.

I claim:

1. A clamp comprising a pair of side bars, a pair of transversely arranged members interconnecting the opposite ends of said bars, one of said members being cylindrical in shape, a clamping lever having an eccentric cam shaped terminal head, said head having an opening therethrough, said cylindrical member extending through said opening to permit said lever to slide on said cylindrical member, a clamping plate, means for supporting said plate adjacent said head and between said transversely arranged members, said plate having thereon a series of stepped faces of varying heights, whereby said head may be moved along the cylindrical member and thereafter rotated to engage a selected face by application of the same hand of the operator.

2. A clamp comprising a pair of side bars, a pair of transversely arranged members interconnecting the opposite ends of said bars, one of said members being cylindrical in shape, a clamping lever having an eccentric cam shaped terminal head, said head having an opening therethrough, said cylindrical member extending through said opening to permit said lever to slide on said cylindrical member, a clamping plate positioned adjacent said head and between said transversely arranged members and having thereon a series of stepped faces of varying heights, said head being slidable along said cylindrical member and thereafter rotatable thereon to engage a desired one of said stepped faces, whereby said head may be moved along the cylindrical member and thereafter rotated to engage said plate by application of the same hand of the operator, the clamping plate being provided with a pair of slots, each side bar extending through a respective slot to permit the plate to slide on the bars as a permanent support for the plate.

3. A clamp comprising a pair of side bars, a pair of transversely arranged members interconnecting the opposite ends of said bars, one of said members being cylindrical in shape, a clamping lever having an eccentric cam shaped terminal head, said head having an opening therethrough, said cylindrical member extending through said opening to permit said lever to slide on said cylindrical member, a clamping plate, means for supporting said plate adjacent said head and between said transversely arranged members and said plate having thereon a series of stepped faces of varying heights, whereby said head may be moved along the cylindrical member and thereafter rotated to engage a selected face by application of the same hand of the operator, each side bar having a slot extending in the direction of the bar, a pin adapted to engage a member to be clamped between the bars and members, one end of said pin being positioned within a respective slot to permit the respective bar to slide relative to the pin.

EDWARD B. BRITTIN.